United States Patent
Rupprecht et al.

(10) Patent No.: US 11,762,850 B2
(45) Date of Patent: Sep. 19, 2023

(54) CONTENT-AWARE NODE SELECTION FOR CONTAINER CREATION

(71) Applicant: International Business Machines Corporation, Armonk, NY (US)

(72) Inventors: Lukas Rupprecht, San Jose, CA (US); Vasily Tarasov, Moorpark, CA (US)

(73) Assignee: International Business Machines Corporation, Armonk, NY (US)

(*) Notice: Subject to any disclaimer, the term of this patent is extended or adjusted under 35 U.S.C. 154(b) by 222 days.

(21) Appl. No.: 17/093,369

(22) Filed: Nov. 9, 2020

(65) Prior Publication Data
US 2022/0147517 A1    May 12, 2022

(51) Int. Cl.
*G06F 16/00*    (2019.01)
*G06F 16/245*    (2019.01)
*G06F 9/455*    (2018.01)
*H04L 67/1097*    (2022.01)

(52) U.S. Cl.
CPC ........ *G06F 16/245* (2019.01); *G06F 9/45558* (2013.01); *H04L 67/1097* (2013.01)

(58) Field of Classification Search
CPC ........ G06F 16/13; G06F 3/067; G06F 3/0604; G06F 3/0647; G06F 16/185; G06F 16/184; G06F 9/455; G06F 9/5077; G06F 16/196; G06F 8/63; G06F 9/5083; G06Q 20/40; G06Q 20/145; G06Q 20/16
See application file for complete search history.

(56) References Cited

U.S. PATENT DOCUMENTS

| | | | |
|---|---|---|---|
| 9,996,380 B2 | 6/2018 | Singh et al. | |
| 10,346,189 B2 | 7/2019 | Chen et al. | |
| 10,521,447 B2 | 12/2019 | Cahana et al. | |
| 2003/0046343 A1* | 3/2003 | Krishnamurthy | ... H04L 67/5682 707/E17.119 |
| 2005/0063337 A1* | 3/2005 | Kashima | ............... H04W 36/24 709/227 |
| 2014/0047341 A1 | 2/2014 | Breternitz et al. | |
| 2017/0315795 A1* | 11/2017 | Keller | ................. G06F 9/45558 |
| 2018/0032258 A1* | 2/2018 | Edwards | ................. G06F 16/13 |
| 2018/0046503 A1 | 2/2018 | Feng et al. | |
| 2018/0287883 A1* | 10/2018 | Joshi | ....................... G06F 9/455 |

OTHER PUBLICATIONS

Combined Search and Examination Report from European Application No. GB2115003.2, dated Jun. 24, 2022.
Tarasov et al., U.S. Appl. No. 17/093,355, filed Nov. 9, 2020.
Hu et al., "Concurrent container scheduling on heterogeneous clusters with multi-resource constraints," Future Generation Computer Systems, vol. 102, 2020, pp. 562-573.

(Continued)

*Primary Examiner* — Yicun Wu
(74) *Attorney, Agent, or Firm* — Zilka-Kotab, P.C.

(57) ABSTRACT

A computer-implemented method according to one embodiment includes receiving a manifest for a container image of a container to be created; identifying a mapping index for a cluster of computing nodes; and selecting a computing node within the cluster of computing nodes to create the container, based on a comparison of the manifest to the mapping index.

20 Claims, 5 Drawing Sheets

(56) References Cited

OTHER PUBLICATIONS

Mao et al., "DRAPS: Dynamic and Resource-Aware Placement Scheme for Docker Containers in a Heterogeneous Cluster," arXiv, 2018, 8 pages, retrieved from https://arxiv.org/abs/1805.08598.

Truyen et al., "Performance overhead of container orchestration frameworks for management of multi-tenant database deployments," Proceedings of the 34th ACM/SIGAPP Symposium on Applied Computing, Apr. 2019, 4 pages.

Perez De Prado et al., "Smart Containers Schedulers for Microservices Provision in Cloud-Fog-IoT Networks. Challenges and Opportunities," Sensors, vol. 20, 2020, pp. 1-21.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

Github, "Intel/telemetry-aware-scheduling," GitHub, 2020, 10 pages, retrieved from https://github.com/intel/telemetry-aware-scheduling.

Fu et al., "Fast and Efficient Container Startup at the Edge via Dependency Scheduling," USENIX HotEdge, 2020, 7 pages, retrieved from https://www.usenix.org/conference/hotedge20/presentation/fu.

Hindman et al., "Mesos: A Platform for Fine-Grained Resource Sharing in the Data Center," 8th USENIX Symposium on Networked Systems Design and Implementation, 2011, pp. 1-14, retrieved from https://www.usenix.org/legacy/events/nsdi11/tech/full_papers/Hindman.pdf.

Verma et al., "Large-scale cluster management at Google with Borg," EuroSys'15, Apr. 2015, 18 pages, retrieved from https://static.googleusercontent.com/media/research.google.com/en//pubs/archive/43438.pdf.

Gog et al., "Firmament: fast, centralized cluster scheduling at scale," 12th USENIX Symposium on Operating Systems Design and Implementation, Nov. 2016, pp. 99-115.

Wagner, T., "Understanding Container Reuse in AWS Lambda," AWS Compute Blog, Dec. 31, 2014, 5 pages, retrieved from https://aws.amazon.com/blogs/compute/container-reuse-in-lambda/.

Wang et al., "InfiniCache: Exploiting Ephemeral Serverless Functions to Build a Cost-Effective Memory Cache," 18th USENIX Conference on File and Storage Technologies (FAST '20), Feb. 2020, pp. 267-281.

Kubernetes, "Advanced Scheduling in Kubernetes," Kubernetes Blog, Mar. 31, 2017, 5 pages, retrieved from https://kubernetes.io/blog/2017/03/advanced-scheduling-in-kubernetes/.

Github, "sebva/sgx-orchestrator," GitHub, 2020, 10 pages, retrieved from https://github.com/sebva/sgx-orchestrator.

Response to Examination Report from European Application No. GB2115003.2, dated Jan. 9, 2023.

\* cited by examiner

CONTENT-AWARE NODE SELECTION FOR CONTAINER CREATION

BACKGROUND

The present invention relates to hardware virtualization, and more particularly, this invention relates to creating and deploying container images.

Modern application deployment often relies on the use of containers. For example, container images are distributed via a central registry, and to start a container, a host pulls a container image and creates a root file system for the container, using the container image. The number of container images as well as the velocity of container deployments are rapidly increasing.

However, there are several issues with current implementations of container images. For example, containers are currently slow and I/O-intensive to start, as they require downloading and storing of large container images that results in a high utilization of local memory and/or storage. Transferring the large container images over communication networks also results in a high network utilization, as well as a high load on a registry service storage subsystem. As a result, current container images are bulky and expensive to transfer and store.

There is therefore a need for a faster and more efficient way to store and distribute container images.

BRIEF SUMMARY

A computer-implemented method according to one embodiment includes receiving a manifest for a container image of a container to be created; identifying a mapping index for a cluster of computing nodes; and selecting a computing node within the cluster of computing nodes to create the container, based on a comparison of the manifest to the mapping index.

According to another embodiment, a computer program product for performing content-aware node selection for container creation includes a computer readable storage medium having program instructions embodied therewith, where the computer readable storage medium is not a transitory signal per se, and where the program instructions are executable by a processor to cause the processor to perform a method including receiving, by the processor, a manifest for a container image of a container to be created; identifying, by the processor, a mapping index for a cluster of computing nodes; and selecting, by the processor, a computing node within the cluster of computing nodes to create the container, based on a comparison of the manifest to the mapping index.

According to another embodiment, a system includes a processor; and logic integrated with the processor, executable by the processor, or integrated with and executable by the processor, where the logic is configured to receive a manifest for a container image of a container to be created; identify a mapping index for a cluster of computing nodes; and select a computing node within the cluster of computing nodes to create the container, based on a comparison of the manifest to the mapping index.

Other aspects and embodiments of the present invention will become apparent from the following detailed description, which, when taken in conjunction with the drawings, illustrate by way of example the principles of the invention.

DETAILED DESCRIPTION

Figure 1:
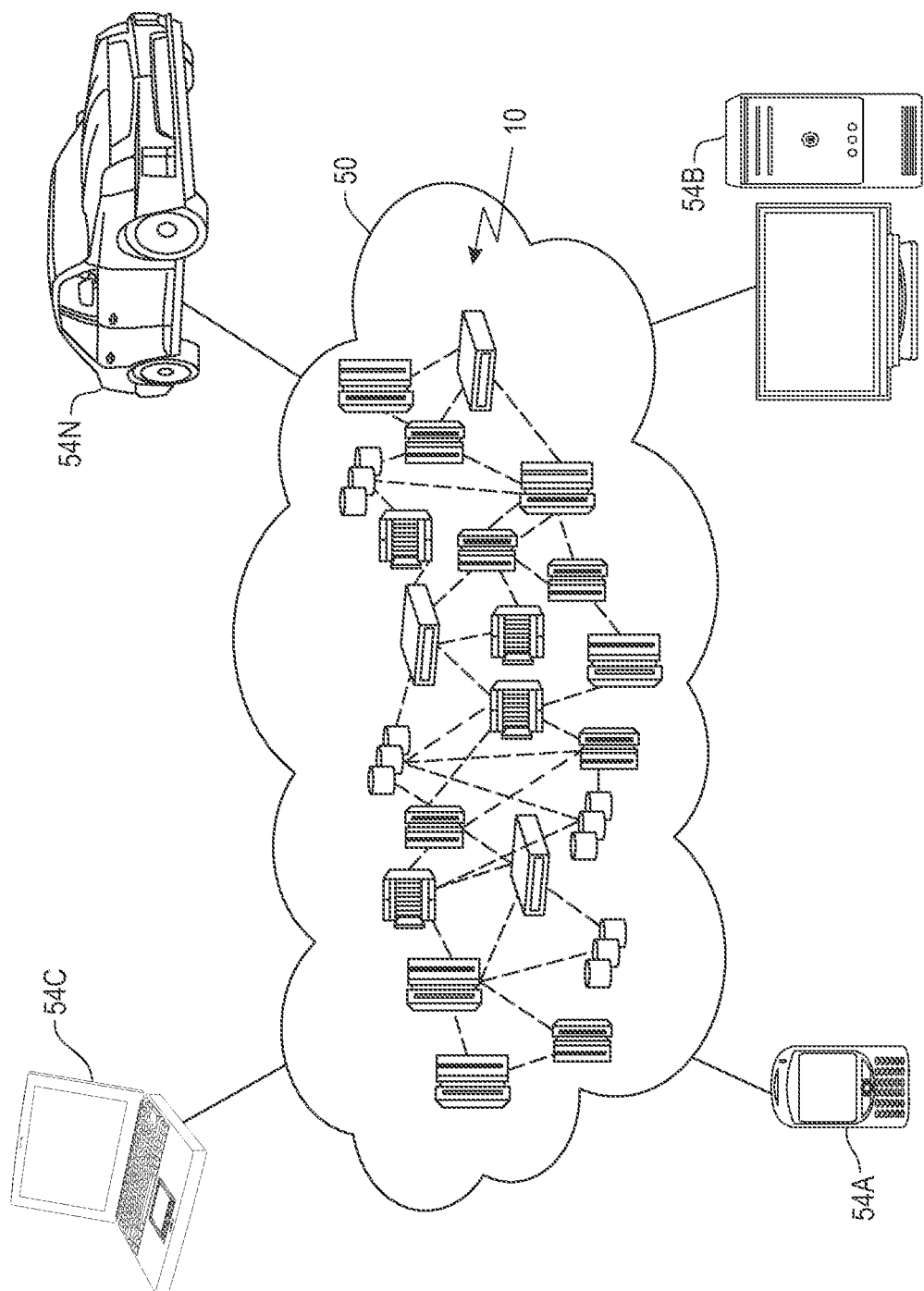
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of performing content-aware node selection for container creation.

In one general embodiment, a computer-implemented method includes receiving a manifest for a container image of a container to be created; identifying a mapping index for a cluster of computing nodes; and selecting a computing node within the cluster of computing nodes to create the container, based on a comparison of the manifest to the mapping index.

In another general embodiment, a computer program product for performing content-aware node selection for container creation includes a computer readable storage medium having program instructions embodied therewith, where the computer readable storage medium is not a transitory signal per se, and where the program instructions are executable by a processor to cause the processor to perform a method including receiving, by the processor, a manifest for a container image of a container to be created; identifying, by the processor, a mapping index for a cluster of computing nodes; and selecting, by the processor, a computing node within the cluster of computing nodes to create the container, based on a comparison of the manifest to the mapping index.

In another general embodiment, a system includes a processor; and logic integrated with the processor, executable by the processor, or integrated with and executable by the processor, where the logic is configured to receive a manifest for a container image of a container to be created; identify a mapping index for a cluster of computing nodes; and select a computing node within the cluster of computing nodes to create the container, based on a comparison of the manifest to the mapping index.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
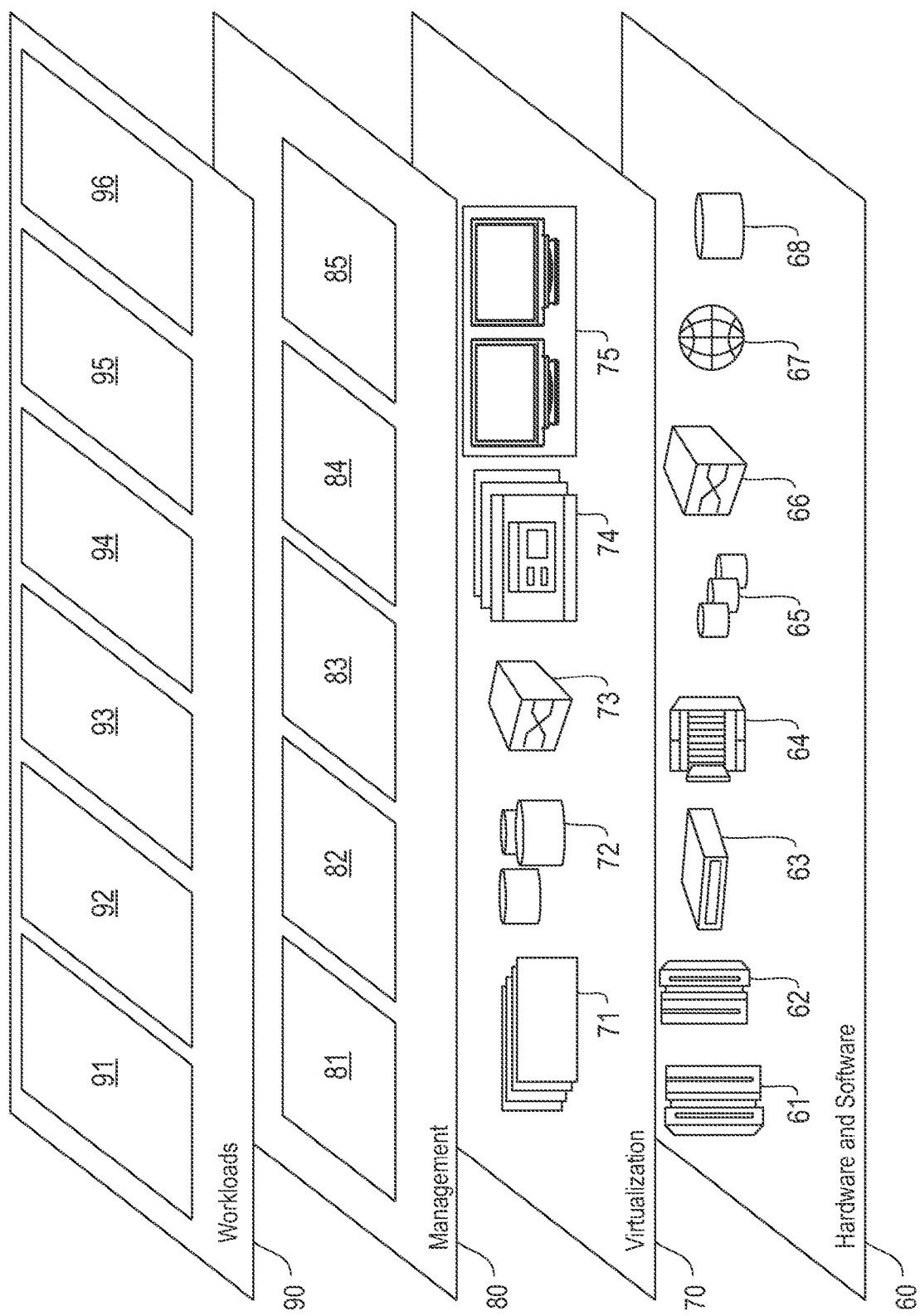
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container image creation and deployment 96.

Figure 3:
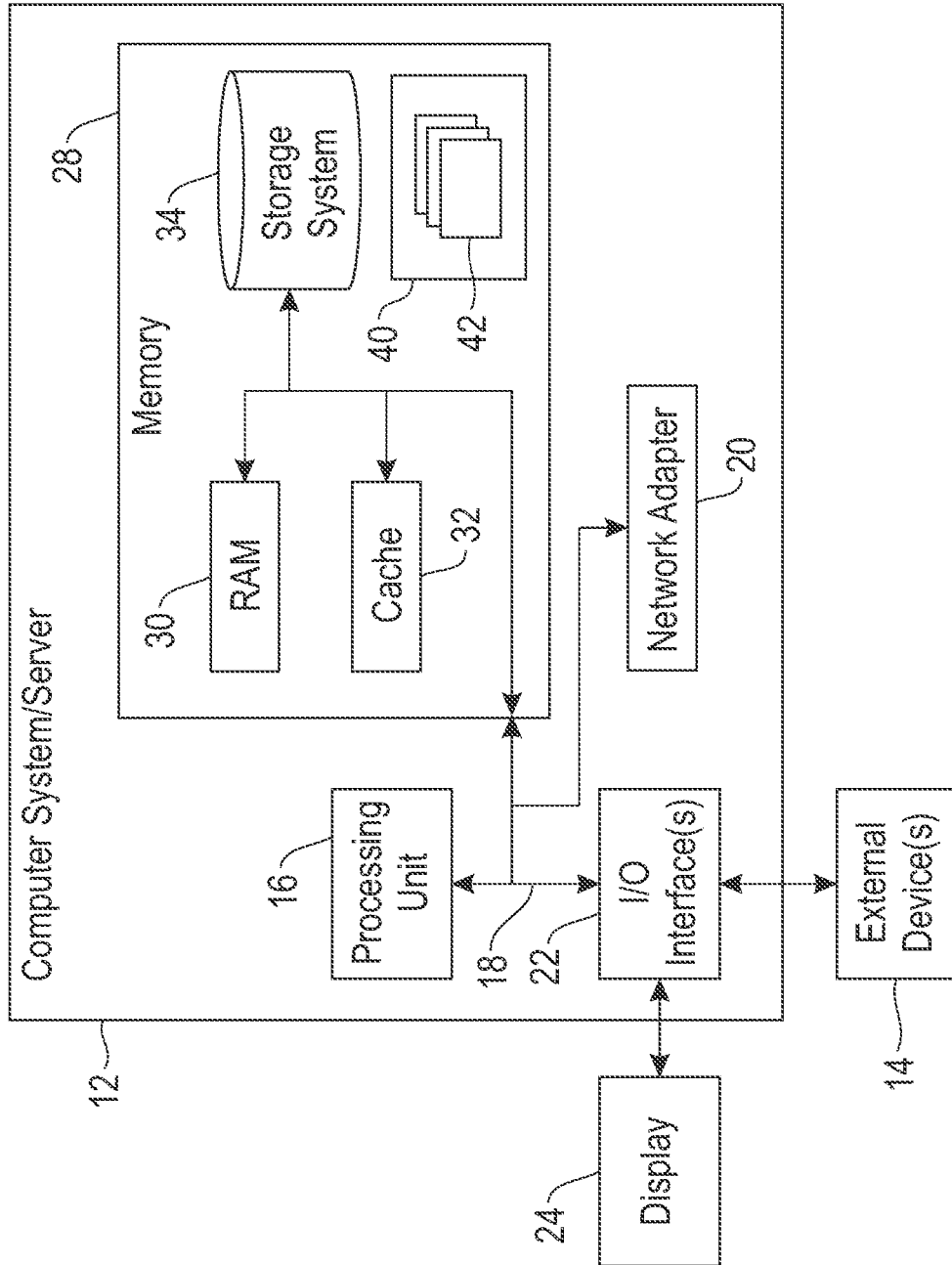
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
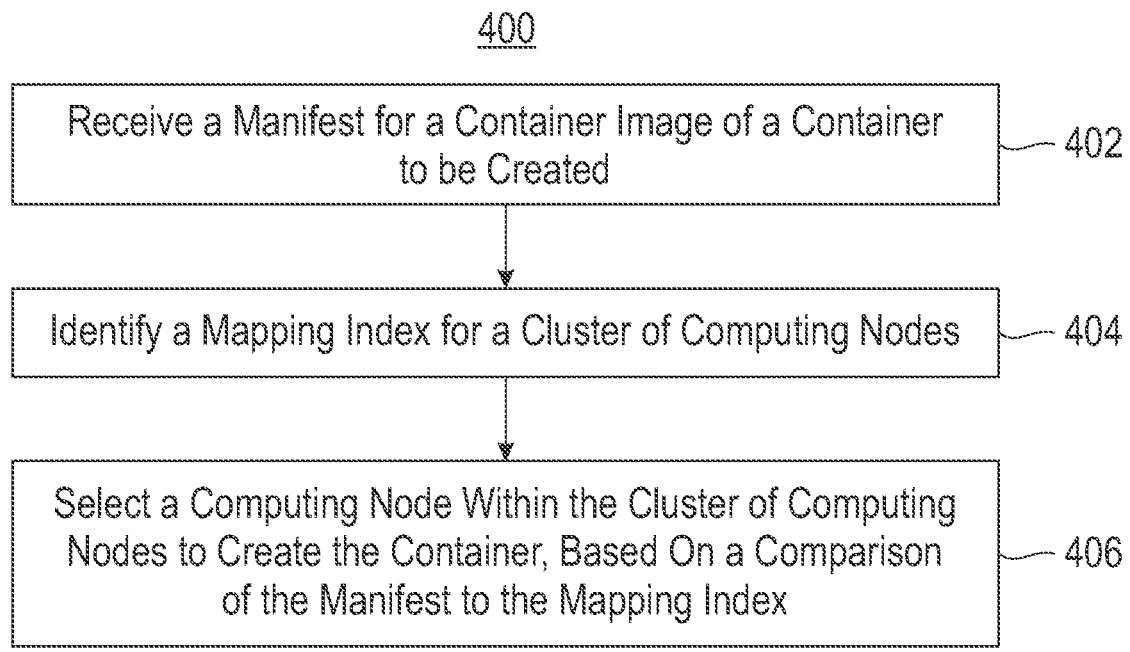
FIG. 4 illustrates a flowchart of a method for performing content-aware node selection for container creation, in accordance with one embodiment of the present invention.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a manifest for a container image of a container to be created is received. In one embodiment, the manifest may be retrieved in response to a request to create a container within a cluster of computing nodes.

For example, the request may be received from a user, an application, etc. In another example, the request may be received at the cluster of computing nodes. In yet another example, the cluster of computing nodes may include a distributed computing network, a cloud-based computing environment, etc. In still another example, the container may include a self-contained software package that implements an operating system (OS)-level virtualization.

Additionally, in one embodiment, creating the container may include mounting a file system for the container at one of the plurality of computing nodes within the cluster, loading one or more libraries within the container and/or running one or more applications within the container, utilizing the mounted file system, etc.

Further, in one embodiment, the container image may include all files needed to create the container at one of the cluster of computing nodes. In another embodiment, the container image may include a plurality of files (e.g., an executable package including code, runtime, system tools, system libraries and settings, etc.). In yet another embodiment, the manifest for the container image may include metadata describing the plurality of files within the container image.

For example, the manifest may include a list of file names (e.g., content identifiers), ownership and/or permissions data associated with those files, etc. In another example, the manifest may include content-based addresses for the files (e.g., file hashes, pointers to locations where the plurality of files are stored, etc.). In still another example, the manifest may store a plurality of file stubs that each include a pointer to a location where the file is stored.

Further still, in one embodiment, the manifest may include metadata describing the plurality of files within the container image, but not the plurality of files themselves. For example, the files may be stored remotely at a content store (e.g., a centralized object storage). In another example, one or more of the files may be stored locally (e.g., at a node where the container is to be created, etc.).

In another embodiment, once the container is created, the manifest may be used by the container to retrieve individual files from the container image as needed (e.g., in a "lazy" manner when requested by an application running within the container, etc.)

Also, in one embodiment, the manifest may be retrieved by a scheduler module separate from the nodes within the cluster. In another embodiment, the manifest may be retrieved from a repository (e.g., registry, etc.). For example, a scheduler module separate from the nodes within the cluster may retrieve the manifest for the container image of the container from a manifest repository (e.g., a database, etc.) that is physically separate from the scheduler module. In yet another embodiment, the manifest may be received at an overlap calculation module from a scheduler.

In addition, method 400 may proceed with operation 404, where a mapping index for a cluster of computing nodes is identified. In one embodiment, the mapping index may be identified at a repository. In another embodiment, the mapping index may be stored locally at a scheduler module. In one embodiment, the mapping index may be stored remotely (e.g., as a separate database, etc.). In yet another embodiment, the mapping index may store identifiers for each node within the cluster of computing nodes.

Furthermore, in one embodiment, mapping index may store identifiers (e.g., content identifiers, etc.) of all container image files currently stored within each node of the cluster of computing nodes. For example, each node within the cluster of computing nodes may store one or more portions of one or more container images. In another example, these portions include container image files. In yet another example, these portions may be stored within a cache of each of the nodes. In still another example, each node within the cluster of computing nodes may store different portions of one or more container images (e.g., different container image files, etc.) when compared to other nodes of the cluster.

Further still, in one embodiment, content identifiers for each container image file currently stored within a node of the cluster of computing nodes may be linked (e.g., mapped, etc.) to an identifier for the node (e.g., a node identifier, etc.) within the mapping index. In this way, the mapping index may store an indication of all container image files stored within each node of the cluster.

Also, in one embodiment, the mapping index may store only a portion (e.g., a prefix) of each content identifier to reduce an amount of stored data within the mapping index. In another embodiment, the mapping index may be retrieved from a repository (e.g., registry, etc.). For example, the mapping index may be retrieved from the same repository where the manifest is retrieved. In yet another embodiment, the mapping index may be received at an overlap calculation module from a scheduler.

Additionally, method 400 may proceed with operation 406, where a computing node is selected within the cluster of computing nodes to create the container, based on a comparison of the manifest to the mapping index. In one embodiment, the overlap calculation module may compare the list of content identifiers within the manifest to the content identifiers linked to node identifiers within the mapping index.

Further, in one embodiment, for each node identifier within the mapping index, the overlap calculation module may determine a number of content identifiers within the manifest that are linked to the node identifier. For example, the number of content identifiers within the manifest that are linked to a node identifier may be summed to create a score for the node identifier. In this way, the overlap calculation module may determine a number of container image files for the container image that are currently stored within each of the nodes of the cluster.

Further still, in one embodiment, a node that is linked to the largest number of content identifiers within the manifest (e.g., when compared to the other nodes within the cluster) may be selected to create the container. For example, the node identifier that has the highest score may be identified and returned. In another embodiment, a subset of node identifiers within the mapping index may be identified to compare to the manifest.

For example, only node identifiers for nodes that meet one or more additional resource requirements may be compared to the manifest. In another embodiment, the additional resource requirements may include a minimal amount of available cache memory for a node, a minimal amount of nonvolatile storage for a node, etc. For example, only node identifiers associated with nodes having a current available cache memory amount above a predetermined threshold may be compared to the manifest.

Also, in one embodiment, a subset of all content identifiers within the manifest may be identified to compare to the mapping index. For example, each content identifier within the manifest may be assigned a weight value based on an amount of historical access for a file represented by the content identifier. In another example, only content identifiers with a weight above a predetermined threshold may be compared to the mapping index. in this way, a node selection time may be reduced by limiting a number of node identifiers and content identifiers to be compared.

As a result, a node currently storing the largest number of container image files for a container image of the container may be selected to create the container. This may minimize an amount of container image files that need to be retrieved by the node during a creation/running of the container on the node, which may in turn reduce an amount of bandwidth used to transfer such container image files. This may reduce an amount of network traffic between the node and a container image store, thereby improving a performance of one or more hardware components implementing such network communications. This may also decrease a latency for container image file retrieval by the node (by maximizing the number of local container image files), which may improve a performance of computing hardware of the node during container implementation.

In addition, in one embodiment, the creation of the container may be scheduled at the selected node. In another embodiment, a file system for the container may be mounted at the selected node, utilizing the manifest. For example, the manifest may include sufficient data to create (e.g., mount) a file system for the container. In another example, the manifest may include one or more mode descriptors and file hashes.

Furthermore, in one example, the inode descriptors may include metadata used to mount the file system for the container. In another example, the file system may be mounted at a node of the cluster of computing nodes (e.g., the node assigned the task of creating the container, etc.).

Further still, in one embodiment, the file system mounted for a container may identify a request to access data within a container image of the container. For example, the request to access data may include a file read request. In another example, the request to access data may include a request from an application within the container to read data within the container image. In yet another example, the data may include a container image file.

Also, in one embodiment, a location of the data may be determined utilizing the manifest. For example, the location of the data may be included within metadata stored within the manifest. For instance, the metadata may describe the plurality of files within the container image. In another example, the manifest may include content-based addresses for the files (e.g., file hashes, pointers to locations where the plurality of files are stored, etc.).

Additionally, in one embodiment, the data may be retrieved, utilizing the location of the data. For example, the data may be retrieved locally from a cache of the node, or remotely from a content store/repository/registry. For instance, cache may include a high speed, low latency memory that is faster than standard data storage within a node of a cluster. In another embodiment, the cache may include volatile memory. In yet another embodiment, the content store may be physically separate from the node of the cluster, and may be accessed via a communications network. In still another embodiment, the content store may also store the manifest that was initially received.

Further, in one embodiment, in response to determining that the manifest for the image indicates that the data is stored locally at the cache of the node, the data may be retrieved from the cache. In another embodiment, in response to determining that the manifest for the image indicates that the data is not stored locally at the cache, the data may be retrieved from the content store, utilizing the communications network.

Further still, in one embodiment, the content store may store the data in association with the container image. In another embodiment, the retrieved data may be used by the mounted file system. For example, the retrieved data may be presented to an application running within the node, utilizing the mounted file system.

Also, in one embodiment, the mapping index may be updated in response to the retrieval of a container image file, and the storage of such container image file at the node. For example, a content identifier for the retrieved container image file may be linked/mapped to an identifier for the node within the mapping index. In another embodiment, the mapping index may be updated in response to the removal of a container image file from the node. For example, the node may evict cached container image files after a predetermined time threshold has been exceeded.

In this way, the mapping index may be updated to accurately indicate all container image files currently stored at all nodes within the cluster.

Content-Aware Container Scheduling

In one embodiment, containers are scheduled such that an overlap of existing content on the target node is maximized. The mapping of content is made to container hosts. An optimal target host is computed based on the overlap and additional constraints. The mapping is updated online when the content is retrieved/evicted from a host.

Additionally, less network traffic is required as less content needs to be retrieved (e.g., some policies often repull images every time a container is (re)run). Less storage and memory are required as existing content can be reused and does not need to be stored redundantly. Less input/output (I/O) bandwidth is required as cached content can be reused. Overall, a higher container density may be achieved due to maximized data reuse.

Figure 5:
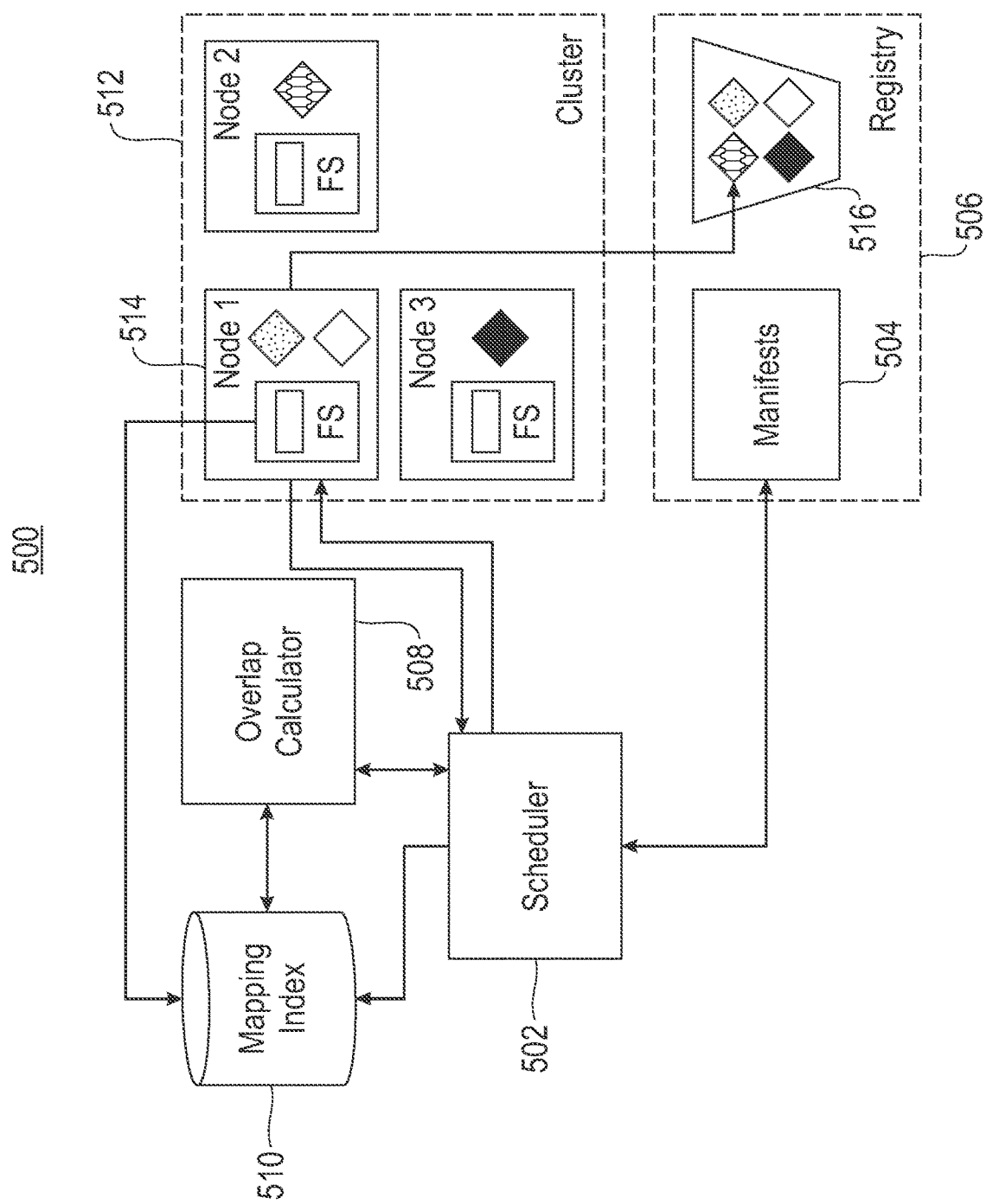
FIG. 5 illustrates an exemplary system architecture, in accordance with one embodiment of the present invention.

FIG. 5 illustrates an exemplary system architecture 500, according to one embodiment. As shown, a scheduler 502 receives a request to run a container. In response to receiving the request, the scheduler 502 retrieves a manifest 504 for the container from a registry 506.

The scheduler 502 then sends the retrieved manifest 504 to an overlap calculator 508. In one embodiment, the scheduler 502 and the overlap calculator 508 may be located within a single computing system. In another embodiment, the scheduler 502 and the overlap calculator 508 may be located within separate computing systems.

In response to receiving the retrieved manifest 504, the overlap calculator 508 identifies a mapping index 510 and compares the retrieved manifest 504 to the mapping index 510 to compute a maximum overlap between content identifiers within the mapping index 510 and content identifiers within the retrieved manifest 504. For example, a node 514 within the mapping index 510 that is linked to the largest number of content identifiers found within the retrieved manifest 504 (e.g., when compared to the other nodes within a cluster 512) may be selected to create the container.

In response to identifying the node 514 with the maximum overlap, the node 514 is scheduled by the scheduler 502 to run the container. The retrieved manifest 504 may be sent from the scheduler 502 to the node 514, and may be used to mount a file system for the container within the node 514.

After the file system is mounted within the node 514, additional container image data not found in the manifest may be requested by the mounted file system. In response to this request, the node 514 may retrieve the requested content 516 from the registry 506 in an on-demand fashion. The node 514 may then send an indication of this retrieved content 516 to the mapping index 510, and the mapping index 510 may be updated to reflect this newly retrieved content 516 at the node 514. The mapping index 510 may also be updated in response to the node 514 removing one or more instances of content as well, such that the mapping index 510 contains an up-to-date snapshot of all container data stored at each node of the cluster 512.

Identifying the Target Node

In one embodiment, the mapping index may be stored. For example, the mapping index may include N sub-indexes, one for each node within the cluster. Each index may include a hash set, containing the content IDs of the files on that node. Constant-time lookups may be performed per index. The size of the index may be reduced by only storing a prefix of each content ID.

Computing the Target

In one embodiment, a node with the highest overlap of existing files with the manifest may be identified that also fulfills any other scheduling requirements (e.g., number of nodes, amount of available RAM, etc.). Exemplary steps are as follows:
1. For each node in the mapping index, check how many files of the image already exist on that node (e.g., $O(N*M)$), where N is the number of nodes and M is the number of files in the manifest.
2. Sort the nodes according to the overlap size
3. Schedule the container on a node with the highest overlap size that also fulfills all other scheduling requirements Reducing Scheduling Decision Times In one embodiment, an additional index may be added from an image to a node. Each entry may map an image to a list of nodes. For each node, images that have been started and their time of start may be tracked. A node that last started an image may be selected to start a new instance of that image.

In another embodiment, nodes may be filtered according to other resource requirements first. For example, only nodes that fulfill other resource requirements may be checked for overlap (e.g., $O(N*M)$ reduces to $O(N\_R*M)$, where $N\_R$=set of remaining nodes, fulfilling resource requirements).

In yet another embodiment, overlap may be computed between the most frequently used subset of an image. For example, each file entry in image may be labeled with a priority based on its access pattern (e.g., the more a file is accessed, the higher its priority). Only files with a priority above a threshold may be considered when computing overlap (e.g., $O(N\_R*M) \rightarrow O(N\_R*M\_p)$, where $M\_p$=a number of files with priority>p).

In still another embodiment, an inverse index of files may be used to list nodes that contain a file. For example, for each file i in an image, a list of nodes ($N\_Fi$) that contain the file may be identified. The lists may be traversed to find a node with the most occurrences as the scheduling target (e.g., where $O(N*M) \rightarrow O(M*N\_Fi+N)$ with worst case $O(M*N+N)$).

Fault Tolerance

In one embodiment, in response to an index node crashing, the index may be periodically flushed to a disk and can be restored on restart. Consistency may not be critical as small discrepancies in the index and an actual cluster state will only impact the quality of scheduling decisions but not the operation itself. No journaling, transactions, etc. may be required. In case of complete index loss, the index may be rebuilt from worker nodes.

In another embodiment, a worker node may crash. The scheduler may stop scheduling to that node automatically, but may keep the index for the node. On node recovery, the file system may send a local index checksum to the scheduler. The scheduler may then compute the checksum of its own index entry. If the checksums diverge, the scheduler may request an entire node index from the node.

In one embodiment, a method is provided for providing content-aware scheduling of container images in a containerized cluster. Additionally, a method is provided that maintains a mapping index to keep track of the location of files in a cluster. Further, a method is provided that uses the mapping index to compute an optimal scheduling target node, which maximizes sharing of existing data, for a new container that needs to be run in the cluster. Further still, a method is provided that reduces scheduling decision times by limiting the number of nodes and files to check in the mapping index.

In one embodiment, a method is provided to perform content-aware container scheduling, including maintaining a mapping between cluster nodes and the image contents they cache, identified through content IDs; updating the mapping whenever a cluster node retrieves or deletes image data; upon receiving a request to schedule a container, downloading the image manifest which lists content ID(s) of the content in the image; comparing the content ID(s) in the image manifest with the content IDs of the data stored on cluster nodes by querying the node to the content mapping; and scheduling the container on the node which has the largest overlap between its cached content and the container image data.

The present invention may be a system, a method, and/or a computer program product at any possible technical detail level of integration. The computer program product may include a computer readable storage medium (or media)

having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a manifest for a container image of a container to be created;
   identifying a mapping index for a cluster of computing nodes;
   selecting a computing node within the cluster of computing nodes to create the container, based on a comparison of the manifest to the mapping index, wherein the computing node that is linked to the largest number of content identifiers within the manifest is selected to create the container; and
   creating the container in the selected computing node including running an application within the container on the selected computing node.

2. The computer-implemented method of claim 1, wherein the manifest for the container image includes metadata describing a plurality of files within the container image, the metadata including a list of content identifiers and content-based addresses.

3. The computer-implemented method of claim 1, wherein the mapping index stores content identifiers of all container image files currently stored within each node of the cluster of computing nodes, where the content identifiers for each container image file currently stored within a node of the cluster of computing nodes are linked to an identifier for the node.

4. The computer-implemented method of claim 1, wherein the mapping index stores only a prefix of each content identifier of all container image files currently stored within each node of the cluster of computing nodes.

5. The computer-implemented method of claim 1, wherein for each node identifier within the mapping index, a number of content identifiers within the manifest that are linked to the node identifier is determined.

6. The computer-implemented method of claim 1, further comprising identifying a subset of node identifiers within the mapping index to compare to the manifest.

7. The computer-implemented method of claim 1, further comprising identifying a subset of all content identifiers within the manifest to compare to the mapping index.

8. The computer-implemented method of claim 1, further comprising updating the mapping index in response to a retrieval of a container image file and a storage of the container image file at a computing node of the cluster.

9. The computer-implemented method of claim 1, further comprising updating the mapping index in response to a removal of a container image file from a computing node of the cluster.

10. The computer-implemented method of claim 1, further comprising scheduling a creation of the container at the selected computing node.

11. The computer-implemented method of claim 10, further comprising mounting a file system for the container at the selected computing node, utilizing the manifest.

12. The computer-implemented method of claim 11, further comprising:
    identifying, by the file system mounted for the container, a request to access data within a container image of the container; and
    retrieving the data, utilizing a location of the data determined utilizing the manifest.

13. The computer-implemented method of claim 1, wherein the selecting includes comparing only node identifiers for computing nodes that meet one or more additional resource requirements to the manifest, wherein the additional resource requirements include a requirement selected from the group consisting of: a minimal amount of available cache memory for the computing node, and a minimal amount of nonvolatile storage for the computing node.

14. A computer program product for performing content-aware node selection for container creation, the computer program product comprising a computer readable storage medium having program instructions embodied therewith, the program instructions executable by a processor to cause the processor to perform a method comprising:
    receiving, by the processor, a manifest for a container image of a container to be created;
    identifying, by the processor, a mapping index for a cluster of computing nodes; and
    selecting, by the processor, a computing node within the cluster of computing nodes to create the container, based on a comparison of the manifest to the mapping index,
    wherein for each node identifier within the mapping index, a number of content identifiers within the manifest that are linked to the node identifier is determined.

15. The computer program product of claim 14, wherein the manifest for the container image includes metadata describing a plurality of files within the container image, the metadata including a list of content identifiers and content-based addresses.

16. The computer program product of claim 14, wherein the mapping index stores content identifiers of all container image files currently stored within each node of the cluster of computing nodes, where the content identifiers for each container image file currently stored within a node of the cluster of computing nodes are linked to an identifier for the node.

17. The computer program product of claim 14, wherein the mapping index stores only a prefix of each content identifier of all container image files currently stored within each node of the cluster of computing nodes.

18. The computer program product of claim 14, wherein a node that is linked to the largest number of content identifiers within the manifest is selected to create the container.

19. The computer program product of claim 14, comprising program instructions for creating the container in the selected computing node including running an application within the container in the selected computing node.

20. A system, comprising:
a processor; and
logic integrated with the processor, executable by the processor, or integrated with and executable by the processor, the logic being configured to:
receive a manifest for a container image of a container to be created,
wherein the manifest for the container image includes metadata describing a plurality of files within the container image, the metadata including a list of content identifiers and content-based addresses;
identify a mapping index for a cluster of computing nodes,
wherein the mapping index stores content identifiers of all container image files currently stored within each node of the cluster of computing nodes, where the content identifiers for each container image file currently stored within a node of the cluster of computing nodes are linked to an identifier for the node;
select a computing node within the cluster of computing nodes to create the container, based on a comparison of the manifest to the mapping index, wherein the computing node that is linked to the largest number of content identifiers within the manifest is selected to create the container; and
create the container in the selected computing node and run an application within the container in the selected computing node.

* * * * *